(12) United States Patent  
Fuenfgeld et al.

(10) Patent No.: US 7,099,662 B2  
(45) Date of Patent: Aug. 29, 2006

(54) TRANSCEIVER UNIT WITH INTERFERENCE-REDUCING ANTENNA

(75) Inventors: Martin Fuenfgeld, Hohberg (DE); Josef Fehrenbach, Haslach i.K. (DE); Karl Griessbaum, Muehlenbach (DE)

(73) Assignee: Vega Grieshaber KG, Schiltach (DE)

( * ) Notice: Subject to any disclaimer, the term of this patent is extended or adjusted under 35 U.S.C. 154(b) by 563 days.

(21) Appl. No.: 10/638,394

(22) Filed: Aug. 12, 2003

(65) Prior Publication Data

US 2004/0087342 A1 May 6, 2004

Related U.S. Application Data

(63) Continuation-in-part of application No. 09/987,450, filed on Nov. 14, 2001, now abandoned.

(60) Provisional application No. 60/273,328, filed on Mar. 6, 2001.

(30) Foreign Application Priority Data

Nov. 21, 2000 (DE) .............................. 100 57 691

(51) Int. Cl.  
*H04Q 7/20* (2006.01)

(52) U.S. Cl. ............ 455/423; 455/570; 342/124; 73/290 R

(58) Field of Classification Search ............ 455/423, 455/63.1, 67.11, 67.12, 570; 342/124; 73/290 R; 370/286; 379/406.01  
See application file for complete search history.

(56) References Cited

U.S. PATENT DOCUMENTS

| 4,661,817 A | 4/1987 | Bekkadal et al. |
| 5,659,321 A | 8/1997 | Burger et al. |
| 6,078,280 A * | 6/2000 | Perdue et al. ............... 342/124 |

FOREIGN PATENT DOCUMENTS

DE 43 31 353 A1 3/1995

* cited by examiner

*Primary Examiner*—Lee Nguyen  
(74) *Attorney, Agent, or Firm*—Nath & Associates PLLC; Gregory B. Kang; Derek Richmond

(57) ABSTRACT

A transceiver unit, particularly for measuring applications, comprising a transmitter (1) for generating a signal, an acquisition antenna (5) for emitting the signal in an acquisition volume and for picking up an effective echo signal reflected by the acquisition volume, as well as a receiver (2) for evaluating an echo signal supplied by the acquisition antenna (5). The echo signal is composed of the effective echo signal and an unwanted echo signal generated by the acquisition antenna (5). In order to compensate for the unwanted echo signal, an antenna simulation (6) is connected via a coupler (3) to the transmitter (1) and the receiver (2) which, after having received the signal, supply an correction signal in proportion to the unwanted echo signal. The coupler so heterodynes the correction signal and the echo signal that the correction signal and the unwanted echo signal cancel out each other.

9 Claims, 3 Drawing Sheets

TRANSCEIVER UNIT WITH INTERFERENCE-REDUCING ANTENNA

This application is a continuation-in-part application of U.S. patent application Ser. No. 09/987,450, filed Nov. 14, 2001, now abandoned which is a non-provisional of provisional application 60/273,328, filed Mar. 6, 2001, the contents of which are hereby incorporated by reference in their entirety.

This invention relates to a transceiver unit which is particularly suitable for non contact level measuring applications, comprised of a transmitter for generating a signal, an acquisition antenna for emitting the signal in an acquisition volume and for picking up an effective echo signal reflected by the acquisition volume, as well as a receiver for evaluating an echo signal supplied by the acquisition antenna.

These types of transceiver units are used in measuring systems for various applications in which the signal received by the acquisition antenna is evaluated for indications concerning the existence, nonexistence, local distribution, or nature of objects to be acquired in the acquisition volume.

One example of this type of system is a level radar, in which one radio wave in a container is emitted, and an echo reflected from the container is evaluated to obtain information concerning the substance level in the container.

When evaluating this type of echo signal, the problem arises that, as a rule, said signal is composed not only of the portions of the intended target object; or objects. Their portions, hereinafter referred to as effective echo signals, in most cases superimpose an unwanted echo signal, which may originate from various sources. One source of unwanted echo signals are reflections within the antenna itself, which is especially noticeable when there is a short distance between the acquisition antenna and the target object. These types of reflections occur throughout the antenna where wave guide sections with varying characteristic impedances are adjacent to each other. In principle, the primary echo of such a mismatching point in the echo signal can be suppressed by gating, because it is received earlier than each real echo reflected by the target object as a result of the short path of the receiver. However, because the echo of such a mismatching point is exclusively transmitted over a wave guide and thus is subjected to a very low distance-dependent attenuation, whereas the intensity of the effective echo signal decreases with the square of the length of the traveling path, multiple reflections of such "antenna echo" may also seriously impede the evaluation of the effective signal for small measuring distances.

The Burger patent (=U.S. Pat. No. 5,659,321) describes a level measuring radar system that relies on a conventional concept for designing such a device. This concept comprises, for instance, components shown in FIG. 1: transmitter, reception and analysis circuit, coupler for separating transmission and reception, antenna and reception mixer. The invention consists in varying the given concept, from which a conventional radar module (1) results, by inserting a frequency conversion (2) between radar module (1) and antenna (7) such that arbitrary transmission frequencies can be generated and emitted. The unmodified initial frequency of such an (existing) radar module is converted by means of, for example, a local oscillator (LO) (5) to, for instance, a higher frequency and then emitted, the reflection is received, mixed back to the lower frequency by the same frequency conversion (2) and evaluated by the receiver of the radar module. The advantage of this circuitry concept is that different versions of level measuring radars can be constructed, all using a common radar module with standardized input and output frequency and differing only in the frequency conversion. This Burger patent has in common with the present invention only the fact that it describes the technological background of our invention (level measuring radar with transmitter, receiver, coupler, antenna). The essential point of our application, the reduction of interfering antenna reflections by overlapping a correction signal, is not mentioned by Burger even as a problem, much less as an approach to a solution.

The Murphy patent (=U.S. Pat. No. 6,181,791) describes how undesired received signals can be eliminated in a communications system for bidirectional data transmission (for instance, between a PC and an Internet service provider) (see col. 4, lines 46–49). These undesired received signals originate by virtue of the fact that a communication participant, the PC with internal modem, for instance, generates a strong transmission signal which is partially reflected owing to incorrect line matching of the transmission line and appears in the receiver as a noise signal. To suppress this noise signal, it is proposed to feed part of the generated transmission signal to a difference-forming reception amplifier (14,114). In this amplifier, the scaled correction signal is subtracted from the received signal and thereby the echo noise is eliminated (see col. 2, lines 66–67).

The scaling of the correction signal is adapted to the conditions by, for instance, determining an optimal echo noise cancellation before the actual communication via a test signal.

The formation of the scaled correction signal is accomplished by feeding the transmission signal to a unit for voltage scaling. This can be, for example, a fixed or adjustable voltage divider. The adjustable voltage divider consists, for instance, of a resistor network with switches for setting the desired voltage division ratio (see FIG. 3).

In another embodiment, the correction signal is formed by selecting one of a variety of digitally stored correction signals and feeding it via a D/A converter to the difference-forming amplifier (see FIG. 4).

Alternatively to the selection from a stored palette of correction signals, the reflection behavior of the communications line can be determined by emitting a test signal and evaluating the associated received signal, and a correction signal can be calculated by adaptation thereto (col. 8, lines 7–28).

Although Murphy describes the suppression of undesired received signals by superimposition of an internally generated correction signal, there are fundamental differences from the present application with regard to the technical background and the technical implementation of this fundamental idea. From its technical background, a wired bidirectional communication has little to do with a measuring apparatus for measuring the transit time of reflected waves.

Even if the teaching of the above-cited publications were combined, that does not result in the invention we claim, because Murphy generates the correction signal either directly, by scaling the transmission signal, or by calculation on the basis of measured test signals.

For Murphy, the elimination of the noise signal always takes place by difference formation in a differential amplifier (14, 114).

The present application proposes to generate the correction signal by an antenna simulation. It is evident from the present description that a mere scaling as in Murphy is not sufficient here. That is why a resistor network formed from complex resistors, not real resistors as in Murphy, is described in one of our embodiments. Only in that way can the complex reflection behavior of the antenna be simulated at all. Simulation by means of a real second antenna of identical design cannot be found in Murphy, not even in a broad sense. The overlapping of the signals in the coupler cannot be found in Murphy either. Nor can it be deduced from the Burger patent how the coupler used there for transmission/reception separation could be employed for the overlapping of undesired received signals and generated correction signals.

It is the object of the present invention to present a transceiver unit of the aforesaid type, which enables the generation of an echo signal with no or very little interference, even with a narrow distance between the antenna and the object reflecting the echo.

The foregoing object is achieved with an inventive transceiver unit. An antenna simulation is connected to the transmitter having received the signal via a coupler. The coupler supplies a correction signal in proportion to the echo signal and superimposes the correction signal and echo signal so that the correction signal and interference echo signal cancel out each other.

Within the meaning of the invention, the antenna may be a antenna emitting the wave into the free vicinity, for example a horn antenna, parabolic, planar antenna, rod radiator, or a dialectic rod radiator. In addition, the antenna may also represent a coupling on wave guides. This, for example, can be a coupling on a coaxial probe, single-wire line, two-wire line, or wave guide.

In the first inventive design, which is particularly easy to realize, the antenna simulation is a second antenna, which is so placed that it radiates in an absorber. It is quite obvious that such a second antenna, with a design corresponding to the acquisition antenna, provides exactly the same reflection-conditional interference echo signal in the antenna. Because the absorber does not reflect the echo signal, the echo signal transmitted by the antenna simulation exclusively consists of the unwanted echo signal. By subtracting said signal from the echo signal in the coupler, which is supplied by the acquisition antenna, the pure effective echo signal is isolated.

In particular, if the acquisition antenna is used exclusively in an acquisition volume, this design may be advantageous in that the immediate vicinity of the acquisition antenna at the antenna simulation is to be so reproduced that, for example, echo paths reflected by the container walls adjacent to the acquisition antenna, which do not correspond with the echo of the objects to be acquired, are reproduced in the signal of the antenna simulation and, thus, can be deleted in the coupler.

If the reflection coefficients of the wave resistance discontinuities of the acquisition antenna and the antenna simulation are similar, for example, if both antennas are of similar design, it is appropriate if the transceiver unit comprises a power splitter for distributing the sampled signals with respectively equal power to the acquisition antenna and to the antenna simulation. In this case, the amplitudes of the unwanted echo signal and the correction signal respectively are equal, so that the correction signal and the echo signal can be superimposed without using correction factors in order to delete the unwanted echo signal.

As a result of the second embodiment, the antenna simulation is a network of complex resistors. In one of said networks, the individual discontinuities of the wave resistance of the acquisition antenna are simulated by elements of complex resistors. Their values can respectively be so selected that they are in a fixed proportional ratio to the reflection coefficients of the discontinuities of the acquisition antenna, in which the proportional factor is largely freely selectable. This design allows, among other things, the generation of the individual echoes of the compensation signal respectively which are 180° out of phase to those of the unwanted echo signal, so that a compensation of the unwanted echo signal can be effected by a simple additive heterodyning.

As with the second design, the reflection coefficients of the antenna simulation, for example, can be selected as a greater value than that of the acquisition antenna. It suffices if the first is provided with a smaller fraction of the transmission power than the acquisition antenna in order to receive a correction signal with an intensity which suffices to suppress the unwanted echo signal.

If the echo signal is a high-frequency radio signal, it may be desirable that between the acquisition antenna and the coupler, or between the acquisition simulation and the coupler, a mixer for converting the echo signal respective correction signal is supplied on a lower intermediate frequency, in order to use a coupler of a simpler design.

In particular, the coupler may have the structure of a wave guide ring with four connections which respectively are interconnected by wave guide sections, the length of which corresponds to one-quarter of the wavelength of the sampled signal. The acquisition antenna and the simulation are connected to adjacent connections, in order to achieve an in-phase opposition heterodyning of the echo signals and the compensation signal solely as a result of the signal propagation time on the intermediate wave guide section. The transmitter and receiver may be connected jointly to a connection adjacent to the connection of the acquisition antenna or the simulation.

Further characteristic features and inventive advantages result from the following description of examples in reference to the included figures. Of the figures.

Figure 1:
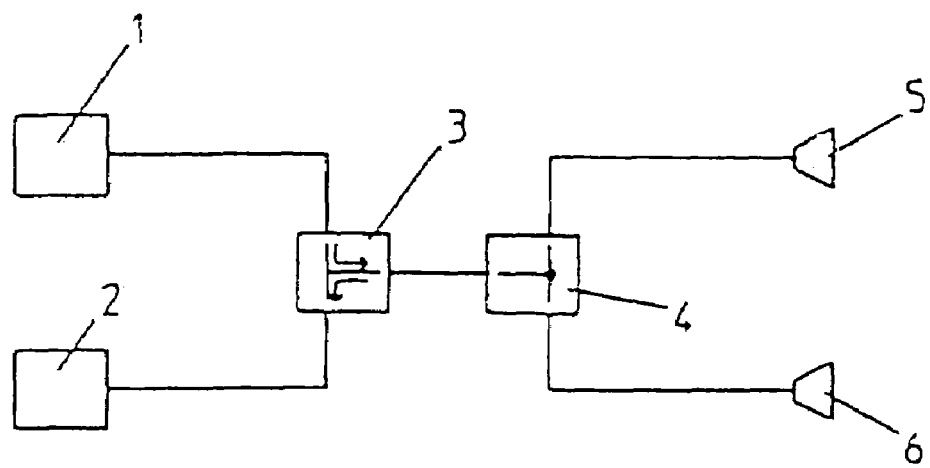
FIG. 1 shows a block diagram of transmitter or receiver unit according to the first inventive embodiment.

By means of a block diagram, FIG. 1 illustrates the principle of the invention. A transmitter 1 is connected via a directional coupler 3 with a power splitter 4, which divides the power of the transmitter 1 in equal parts to an antenna 5 and antenna simulation 6. The antenna 5 transmits the high-frequency signals supplied by the transmitter 1 at an acquisition volume of which a fraction of the emitted transmission power is reflected as an echo by the objects to be acquired and collected by the antenna 5. In the antenna 5, said echo signal is heterodyned with an unwanted echo signal, which is created by reflections of the transmission signal at the points of discontinuity of the wave resistance within the antenna. The thus resulting unwanted echo signal is returned by the power splitter 4 to the directional coupler 3.

A second part of the sample signal is fed from the power splitter 4 to the antenna simulation 6. The antenna simulation 6 may be a second antenna, which essentially is similar in design to the antenna 5 as illustrated in greater detail in FIG. 2, or a network as illustrated in greater detail in FIG. 3. The antenna simulation 6 returns a correction signal to the power splitter 5, which is composed of a plurality of contributions, which are characterized respectively by a time delay with respect to the signal, an amplitude, and a phase. Delay and amplitude respectively correspond to the contributions of the unwanted echo signal in the echo signal of antenna 5; the phases are displaced respectively by 180° towards the unwanted echo signal. As a result of the additive heterodyning in the power splitter 5, the respective contributions of the correction signals and the unwanted echo signals delete each other, and the signal transmitted by the power splitter 4 and the directional coupler 3 essentially only contains the echoes of the objects in the acquisition volume to be acquired.

The directional coupler 3 feeds the corrected echo signal to the receiver 2. The transmission paths from the transmitter 1 to the power splitter 4 and from the power splitter 4 to the transmitter 2 are severely attenuated compared with the transmission path from the transmitter 1 to the receiver 2 via the directional coupler 3, so that the signal to be processed in the receiver 2 essentially consists of the echo signal. The remaining parts of the sampled signal of the transmitter 1, which, in the case of an incomplete attenuation of the direct connection, reach the receiver 2 via the directional coupler 3, clearly arrive much earlier at said coupler than the echo signal and, therefore, can be suppressed by a filtering in time.

Figure 2:
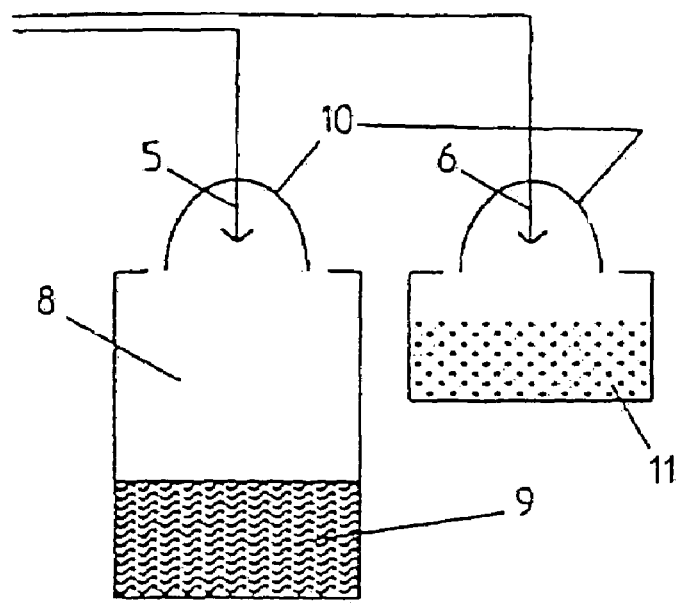
FIG. 2 shows an antenna and antenna simulation for an inventive transceiver unit.

FIG. 2 illustrates the principle described by means of FIG. 1, in which the simulation 6 contains a second antenna which is identical in design to the antenna 5. The acquisition antenna 5 is placed on a tank which is partially filled with fluid, in which the inside of the tank represents the acquisition volume 8 and the fluid 9 in the tank represents a target object. In addition to the echo of the liquid 9 level, the echo signal received by antenna 5 contains portions generated by the reflection from discontinuities generated in the antenna 5 itself, as well as an echo from the rear of the parabolic reflector 10 which serves to bundle the scanning signals transmitted by the antenna 5 in the direction of the fluid level. The reflector 10 is no longer necessarily conductively connected with the antenna 5, but may also be considered as part of the antenna 5.

The antenna simulation 6 is similar in design to the antenna 5, and like said antenna it is equipped with a reflector 10 and emits in an absorber 11. Said absorber 11 may be electrically conducting material of low density, such as a metal or graphite-containing foam, the surface of which only reflects a negligible echo, and which absorbs the signal emitted by the antenna simulation 6 in its interior. Based on the similarity in design to the antenna 5 and simulation 6 and the reflector 10, the two supplied signals merely differ by the portion of the surface of the fluid 9. By selecting the path lengths from the power distributor 4 to the antenna 5 or to the simulation 6, each differing by one-quarter of the wavelength of the sampled signal, one achieves an overlapping in opposite phase of the echo signals transmitted by said antennas at the power splitter 4 and thus only the effective signal part, the echo of the liquid level, is passed on.

Figure 3:
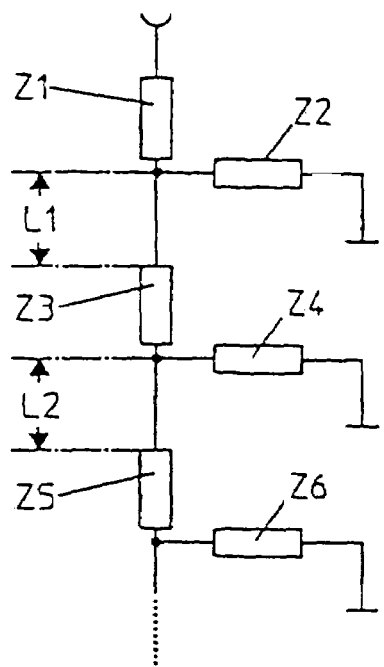
FIG. 3 shows an antenna simulation according to the second inventive embodiment.

FIG. 3 illustrates a realization of the antenna simulation 6 in the form of a network. The network shown in FIG. 3 encompasses a plurality of elements with complex resistors Z1 through Z6. In practice, it has been proven that the complex resistors Z1 and Z6, in part or in whole, can be replaced by real ohmic resistors. The adjustable resistors are used advantageously in order to balance the network with the antenna. Consequently, this enables to adjust the amplitude of each individual contribution of the correction signal supplied by the simulation 6 to the echo signal of the antenna 5. The individual complex resistors Z, Z2 . . . are separated by wave guide sections with lengths L1, L2, which respectively correspond to the distances between the points of discontinuity of the wave resistance in the antenna 5. The wave guide sections L1 and L2, for example, can consist of coaxial wave guides or wave guides in strip transmission line technology. Furthermore, the impedance jumps of the antenna simulation may also be generated by use of lines with the corresponding impedances. As a result, one receives a chain of several line sections, and one is able to dispense with the use of discret components.

In principle, this embodiment may have a random division ratio of the power splitter 4. In order to have the greatest possible power of the transmitter 1 for the actual measuring, it is preferred that the portion of power, which is transmitted to the antenna 5, make up more than 50% of the transmitter power. By correspondingly adjusting the values of the complex resistors Z1, Z2, . . . , the reflectivity of the antenna simulation can be adjusted, and thus it can be ensured that the amplitudes of the individual portions of the correction signal and the unwanted echo signal respectively are opposite and equal and thus cancel out each other at the power splitter 4.

Figure 4:
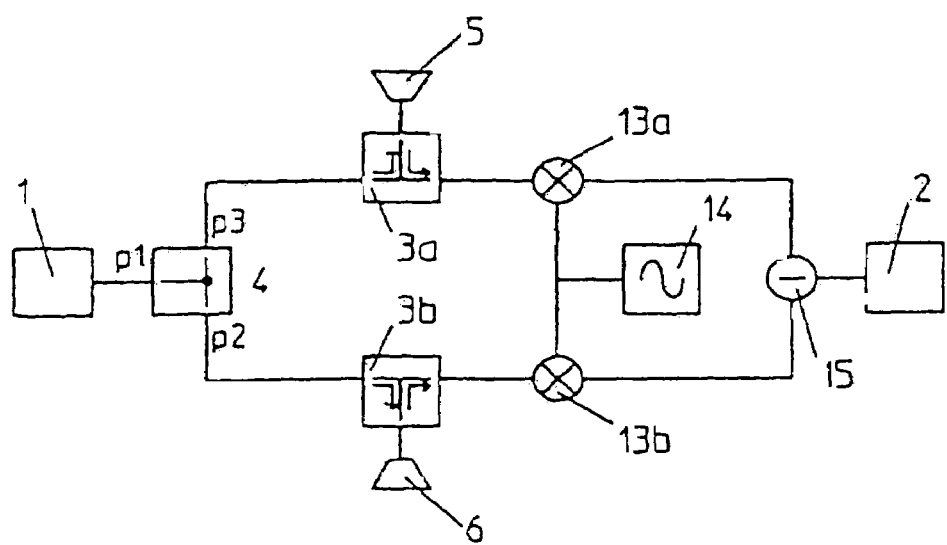
FIG. 4 shows a variant in which a conversion of the echo signal and correction signal occurs on an intermediate frequency.

FIG. 4 shows a modification of the principle shown in FIG. 1, in which the positions of the directional coupler and the power splitter are interchanged. In this case, the output of the transmitter 1 is directly connected to an input p1 of the power transmitter 4; the outputs p2, p3 of said transmitter respectively are connected to directional couplers 3a, 3b, which input the high frequency signal of the transmitter 1 to the antenna 5 respective the simulation 6. The echo or compensation signals received from the antenna 5 or the simulation 6 respectively are input via the directional couplers 3a, 3b to the two mixers 13a, 13b, where, by being mixed with an oscillation supplied by an oscillator 14, said signals are converted into an intermediate frequency which is sufficiently low to be processed in a subtractor 15, which performs the signal heterodyning function of the power splitter 4 of FIG. 1. The echo signal, which is separated from its unwanted echo part by the subtraction in the subtractor 15, then is input to the receiver 2.

Unlike the directional coupler 3 of FIG. 1, the directional couplers 3a, 3b do not require a strong attenuation of the direct connection from the power splitter 4 to the mixer 13a or 13b. Since the signal portions directly passing through the directional couplers potentially are identical, they cancel out each other in the subtractor 15.

Figure 5:
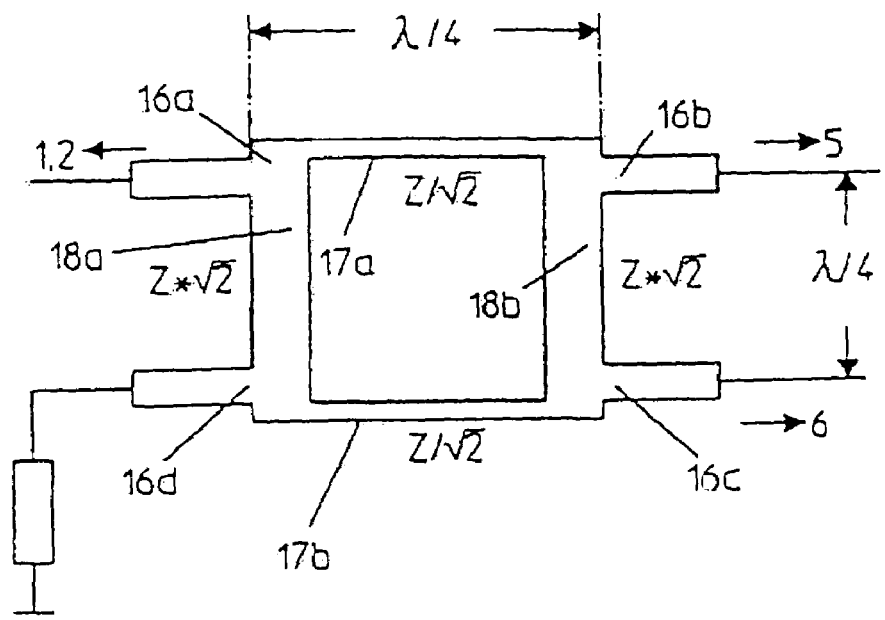
FIG. 5 shows an assembly of a power splitter usable in one of the embodiments of FIG. 1.

FIG. 5 shows an example of a power splitter, which, in the case of an adequate narrow-bandwidth signal can be used as the power splitter 4 in the embodiment of FIGS. 1 and 4. Said coupler concerns a 90° hybrid coupler comprising four connections, 16a, 16b, 16c, 16d, connected to a wave guide ring, which comprises wave guide sections 17a, 17b, 18a, 18b. The lengths of these four wave guide sections respectively correspond to a quarter of the median wavelength of the signal in the wave guide sections the transmitter 1, and receiver 2 are connected to a first connection 16a, appropriately via a directional coupler 3, as shown in FIG. 1. Two antennas 5 or the simulation 6 are connected to two connections 16b, 16c, which are connected by the wave guide section 18b. The fourth connection 16d is terminated with a resistor. The wave impedances in the feed lines from the connections to the transceiver, to the antenna, the simulation, or the resistor respectively have a similar value Z; the wave impedance of the wave guide sections 18a, 18b is Z*{square root over (2)} that of 17a, 17b Z/{square root over (2)}. With this configuration, the signal fed by the transmitter 1 is split into equal parts and attenuated by 3 dB on the antenna 5 and the simulation 6. At the connection 16b, which is assigned to the antenna, a phase shift of −90° occurs in relation to the connection 16a of the transmitter; at the connection 16c of the simulation, a shift of −180° occurs. At the connection 16, the signal is deleted. At the connection 16a, the echo signal from the antenna 5 and the correction signal from the simulation 6 have a 180° phase difference, so that the correction signal destructively heterodynes the unwanted echo signal. The attenuation for the echo signal and the correction signal respectively is 6 dB, so that the unwanted echo signal essentially is completely compensated.

Reflections of the antenna 5 and the simulation 6 are added at the connection 16d. In order to prevent reflections at this point, this port of the coupler, therefore, must be closed with wave impedance Z.

The wave impedances of the individual wave guide sections 17a, 17b, 18a, 18b may also be selected in deviation from the specified values, in order to achieve an uneven distribution of the transmission power to the antenna 5 and the simulation 6.

This is most practical with a circuit simulation of the antenna, as described in reference to FIG. 3, the reflexivity of which can be selected higher than that of the antenna 5.

Figure 6:
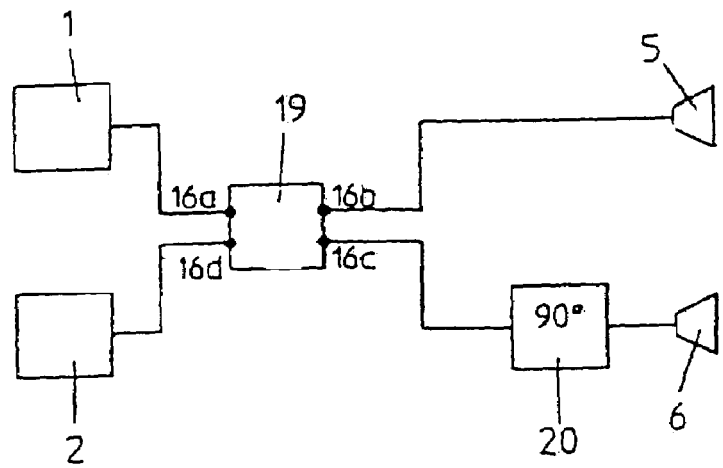
FIG. 6 shows an antenna simulation according to an additional inventive embodiment.

According to an inventive embodiment shown in FIG. 6, the transmitter 1 can be connected at the connection 16a of the 90° hybrid coupler 19. The receiver 2 is located at the connection 16d, the antenna 5 at 16b, and the simulation 6 at the connection 16c, in which a phase rotation unit 20 must be additionally effected by 90° between the connection 16c and the simulation. Therefore, at the connection 16a (transmitter) it results in an addition of the reflections from the antenna and the simulation and at the connection 16d (receiver) in a compensation of the reflections. With this configuration, no additional coupler or power splitter is required apart from the 90° hybrid.

If, instead of a simulation, a complex conjugated simulation (180° rotation) is used, one is able to dispense with the 90° phase shift 20. When using a direct antenna simulation, the displacement of 90° must also be taken into consideration when adjusting the lengths of the wave guide to the antenna and the simulation, which also must be performed in any case.

The invention claimed is:

1. A level measuring device having a transceiver unit comprising:
   a transmitter (1) for generating a signal,
   an acquisition antenna (5) for emitting the signal into an acquisition volume (8) and for picking up an effective echo signal reflected by the acquisition volume (8), as well as
   a receiver (2) for evaluating an echo signal supplied by the acquisition antenna (5), said signal being composed of the effective echo signal and an unwanted echo signal generated by the acquisition antenna,
   wherein:
   an antenna simulation (6) is connected via one or more couplers (3, 4, 19) to the transmitter (1) and the receiver (2), which, upon receiving the signal, provides a correction signal proportional to the unwanted echo signal, and
   the one or more couplers heterodyne the correction signal and the echo signal whereby the correction signal and the unwanted echo signal cancel out each other.

2. A level measuring device having a transceiver unit, as defined in claim 1, wherein the antenna simulation is a second antenna and is so placed that said second antenna emits into an absorber.

3. A level measuring device having a transceiver unit, as defined in claim 2, wherein the antenna simulation is similar in design to the acquisition antenna.

4. A level measuring device having a transceiver unit, as defined in claim 2, wherein said transceiver unit comprises a power splitter for distributing the signal to the acquisition antenna and the antenna simulation, and which feeds a smaller part of the power of the signal to the antenna simulation than to the acquisition antenna, and the antenna simulation has a higher reflectivity than the acquisition antenna.

5. A level measuring device having a transceiver unit, as defined in claim 1, wherein the antenna simulation is a network of complex impedances.

6. A level measuring device having a transceiver unit, as defined in claim 1, wherein said transceiver unit comprises a power splitter that distributes the signals with respective equal power to the acquisition antenna and the antenna simulation.

7. A level measuring device having a transceiver unit, as defined in claim 1, wherein said transceiver unit supplies the correction signal in a 180° phase displacement to the unwanted echo signal.

8. A level measuring device having a transceiver unit, as defined in claim 1, wherein the echo signal is a radio signal and wherein between the acquisition antenna and the coupler or between the antenna simulation and the coupler, respectively, a mixer is placed for converting the echo signal or correction signal to an intermediate frequency.

9. A level measuring device having a transceiver unit, as defined in claim 1, wherein the coupler comprises a wave guide ring with four connections, which respectively are connected through corresponding wave guide sections the lengths of which respectively correspond to one-quarter of the wavelength of the sampled signal,
   wherein:
   the acquisition antenna and the antenna simulation are connected to adjacent ones of said connections, and
   the transmitter and receiver jointly are connected to another of said connections adjacent to the connection of the acquisition antenna or the antenna simulation.

* * * * *